United States Patent
Kanai et al.

(10) Patent No.: US 8,043,708 B2
(45) Date of Patent: Oct. 25, 2011

(54) SURFACE-TREATED METAL, METHOD FOR PRODUCING THE SAME, EXHAUST COMPONENT FOR TWO-WHEELED VEHICLE OR FOUR-WHEELED VEHICLE, AND INTERIOR AND EXTERIOR COMPONENT FOR DOMESTIC APPLIANCE

(75) Inventors: Takao Kanai, Fujisawa (JP); Hiroshi Kanai, Kimitsu (JP)

(73) Assignee: Nippon Steel & Sumikin Stainless Steel Corporation, Tokyo (JP)

( * ) Notice: Subject to any disclaimer, the term of this patent is extended or adjusted under 35 U.S.C. 154(b) by 1304 days.

(21) Appl. No.: 11/107,272

(22) Filed: Apr. 15, 2005

(65) Prior Publication Data

US 2005/0233134 A1    Oct. 20, 2005

(30) Foreign Application Priority Data

Apr. 16, 2004 (JP) .............................. P 2004-121843
Dec. 6, 2004 (JP) .............................. P 2004-352751

(51) Int. Cl.
*B32B 5/16* (2006.01)
*B32B 9/04* (2006.01)

(52) U.S. Cl. ........ 428/447; 428/328; 428/446; 428/448; 428/469

(58) Field of Classification Search .................. None
See application file for complete search history.

(56) References Cited

U.S. PATENT DOCUMENTS 4,267,210 A * 5/1981 Yajima et al. ................ 427/226
4,939,034 A * 7/1990 Sobata et al. ................ 428/336
6,287,640 B1 * 9/2001 McClain et al. ........... 427/388.1
2002/0037398 A1 * 3/2002 Tofuku et al. ................ 428/325
2002/0043922 A1 * 4/2002 Oishi et al. .................... 313/461
2004/0022950 A1 * 2/2004 Jung et al. .................. 427/385.5
2006/0099429 A1 * 5/2006 Domes et al. ................ 428/447
2006/0127681 A1 * 6/2006 Domes et al. ................ 428/447

FOREIGN PATENT DOCUMENTS

| JP | 63172640 | 7/1988 |
|----|----------|--------|
| JP | 2265742 | 10/1990 |
| JP | 810701 | 1/1996 |
| JP | 8245922 | 9/1996 |
| JP | 200280974 | 3/2002 |
| JP | 2002234109 | 8/2002 |
| JP | 2002307606 | 10/2002 |
| JP | 2003160759 | 6/2003 |

OTHER PUBLICATIONS

Derwent Abstract of JP 2003-160759 A to Hamada et al.. "Silica-type coating liquid . . . ". Jun. 6, 2003.*
English Translation of JP 2003-160759 A to Hamada et al., "Alkoxysilane", Jun. 6, 2003.*
English-language translation of portions in which differences between the present invention and cited document, Japanese Patent Application, First Publication No. 2003-160759 are described in the Korean Office Action for the Korean counterpart of the present US application, Jul. 31, 2006.

* cited by examiner

*Primary Examiner* — John J Figueroa
(74) *Attorney, Agent, or Firm* — Dorsey & Whitney LLP

(57) ABSTRACT

A surface-treated metal according to an exemplary embodiment of the present invention can include a metal base material, and an inorganic-organic composite film formed on at least a portion of a surface of the metal base material. The inorganic-organic composite film may have a siloxane bond as a main bond in a main skeleton. The film may further have, in bonds of either or both of the main skeleton and/or a side chain, either or both of an ether bond and/or an amino bond. The film may also include an alkyl group having 1 to 12 carbon atoms, an aryl group, a carboxyl group, an amino group, and/or a hydroxyl group.

9 Claims, No Drawings

SURFACE-TREATED METAL, METHOD FOR PRODUCING THE SAME, EXHAUST COMPONENT FOR TWO-WHEELED VEHICLE OR FOUR-WHEELED VEHICLE, AND INTERIOR AND EXTERIOR COMPONENT FOR DOMESTIC APPLIANCE

CROSS-REFERENCE TO RELATED APPLICATION(S)

The present application claims priority from Japanese Patent Application Nos. 2004-121843 and 2004-352751, filed Apr. 16, 2004 and Dec. 6, 2004, respectively, under 35 U.S.C. §119. The entire disclosures and content of these patent applications are incorporated herein by reference.

FIELD OF THE INVENTION

The present invention relates to a surface-treated metal which has a film formed on a surface thereof, which is resistant to temperatures of 500° C. or more, and which can be subjected to deep drawing and bending. The present invention also relates to a method for producing such metal. In particular, the present invention relates to a surface-treated metal which is suitable for use in exhaust components for vehicles and motorcycles, in cooking utensils, in air conditioners and heating units, and to a method for producing the same.

BACKGROUND INFORMATION

Metallic materials typified by iron are commonly used in a state of being coated for the purpose of protection from thermal and chemical damage factors, thereby improving durability and imparting an attractive appearance. These coated metals likely require various properties such as corrosion resistance, contamination resistance, and heat resistance. Applications utilizing heat resistance include, for example, exhaust components for vehicles and motorcycles, cooking utensils, and air conditioners and heating units. These applications generally require resistance to temperatures of about 300 to 400° C. and, in particular, exhaust components for vehicles require resistance to temperatures of 500° C. or more.

For these applications, since a postcoating method of coating after forming into a predetermined shape leads to high cost and is not suitable for mass production, a precoating method of working after previously coating has been reviewed. According to the precoating method, however, working is performed after forming a film, and thus extreme workability is generally required for the coating film. For example, a thin steel sheet likely requires the workability sufficient to cause neither cracking nor peeling of the film in a 2T to 4T bending test, such that a 180° bending is performed in the state where two to four steel sheets each having the same thickness as that of a test material are laid one upon another, and the adhesion between the film capable of enduring the above test and an underlaying metal.

A silicone resin is known as a material of a film for heat-resistant precoated steel sheet. The heat resistance of the coating film made of the silicone resin remarkably varies depending on the kind and content of the organic group to be introduced into the silicone resin. In general, as the content of the organic group increases, the resultant film is more flexible and is excellent in workability and adhesion on working. On the other hand, the content of the organic substance should be decreased so as to enhance the heat resistance of the film. Thus, the above-mentioned workability and adhesion on working of the film are deteriorated.

Japanese Patent Application, First Publication Nos. S63-172640, H02-265742 and H08-10701 describe, as coated steel sheets which satisfy both heat resistance and workability using a silicone resin, precoated steel sheets produced by using a coating composition containing, as a main component, a silicone resin having an alkyl group, an alkenyl group, and a phenyl group introduced therein. These coating films made of the silicone resin have a workability that is typically required of the precoated steel sheet because of comparatively high content of the organic group, but have a low resistance to temperatures of 400° C. or less. Japanese Patent Application, First Publication No. H08-245922 describes a coating film made of a monomethylsilicone resin having a comparatively low content of the organic group, and the resin coating film is generally insufficient in workability.

To solve such a problem, Japanese Patent Application, First Publication No. 2002-234109 describes a method of using two kinds of resins having different heat resistances in combination. Japanese Patent Application, First Publication No. 2002-307606 describes a resin coating film containing a methylsilicone resin and a linear methylphenylsilicone resin. To improve the workability of the above-mentioned coating film described in Japanese Patent Application, First Publication No. H08-245922, Japanese Patent Application, First Publication No. 2002-80974 describes a method of using a coating composition containing a monomethylsilicone resin as a main component, an isocyanate, and an epoxy resin. As described above, however, satisfactory heat resistance and workability imparted by introduction of an organic component conflict with each other, and there have never been obtained those which generally satisfy both properties at a high level.

The heat treatment temperature should preferably be set to a high temperature so as to form a film having high heat resistance, and the heat-resisting temperature of the film tends to decrease so as to decrease the heat treatment temperature. It was difficult to obtain a precoated steel sheet having high heat resistance because of this problem.

SUMMARY OF THE INVENTION

The present invention is provided to assist in addressing these problems. Indeed, one of the objects of the present invention is to obtain a precoated steel sheet which satisfies heat resistance, workability, and adhesion on working at a high level, for example, a surface-treated metal typified by a precoated steel sheet having resistance to temperatures of 500° C. or more and 2T to 4T bending workability. Another object of the present invention is to obtain a surface-treated metal which satisfies the above properties by not only the precoating method, but also the postcoating method. Still another object of the present invention is to achieve a desired black coating, which may be required for exhaust components for vehicles and motorcycles, and to obtain a black-coated surface-treated metal having the above properties.

These objects can be achieved by a surface-treated metal including a metal base material and an inorganic-organic composite film formed on the surface of the metal base material, the inorganic-organic composite film containing a specific bond as a main bond in a main skeleton, and containing a certain organic component introduced therein.

The surface-treated metal of an exemplary embodiment of the present invention includes a metal base material, and an inorganic-organic composite film formed on at least a portion of the surface of the metal base material. For example, the inorganic-organic composite film may have a siloxane bond as a main bond in a main skeleton, and also has, in bonds of either or both of the main skeleton and a side chain, either or both of an ether bond and an amino bond, as well as at least one organic group selected from the group consisting of an alkyl group having 1 to 12 carbon atoms, an aryl group, a carboxyl group, an amino group, and a hydroxyl group.

According to the surface-treated metal of the exemplary embodiment of the present invention, heat resistance, workability, and adhesion on working at a high level can be satisfied.

In the surface-treated metal of the present invention, the organic group in the film may be a phenyl group.

A percentage of an organic component in the film to the overall film may be 0.5% by mass or more and 50% by mass or less. A ratio of a content of the ether bond and the amino bond in the bonds in the film to that of the siloxane bond can be 0.01 or more, as well as 0.5 or less. The film may include at least one or more compounds selected from the group consisting of oxides having one or more elements selected from the group consisting of Cu, Fe, Mn, Cr, and Co as constituent components, carbon black, graphite powder, and carbon black subjected to a graphitization treatment.

Even in the case of exhaust components for vehicles and motorcycles, which are preferred to be black, surface-treated metals can be obtained which satisfy heat resistance, workability, and adhesion on working at a high level.

The film may further include either or both of nickel particles and nickel oxide particles. The film may have zirconium in a molar ratio of zirconium to silicon Zr/Si of 1/20 to 2/3. The film may further have the alkyl group having 1 to 12 carbon atoms as the organic group, and a portion of the alkyl group is a fluoro-substituted alkyl group. The metal base material may be a plated steel sheet, a stainless steel sheet, a titanium sheet, an aluminum sheet or an aluminum alloy sheet.

A method for producing a surface-treated metal according to an exemplary embodiment of the present invention can include the application of a coating solution containing, as a main component, at least one or more compounds selected from the group consisting of alkoxysilanes of alkoxysilane having an epoxy group, alkoxysilane having an alkyl group having 1 to 12 carbon atoms, alkoxysilane having an aryl group, alkoxysilane having an amino group, and tetraalkoxysilane, and hydrolyzates thereof on at least a portion of a surface of a metal base material. The coating solution can be heat-treated onto the metal base material at a temperature of 150° C. or more.

According to the method for producing a surface-treated metal of the exemplary embodiment of the present invention, the surface-treated metal of the present invention can be suitably produced without requiring large-scale modification of facilities. In the method for producing a surface-treated metal according to the present invention, the coating solution may further include at least one or more compounds selected from the group consisting of oxides having one or more elements selected from the group consisting of Cu, Fe, Mn, Cr, and Co as constituent components, carbon black, graphite powder, and carbon black subjected to a graphitization treatment.

An aspect of exhaust components for two-wheeled vehicles or four-wheeled vehicles according to an exemplary embodiment of the present invention can include the surface-treated metal of the present invention. An aspect of interior and exterior components for domestic appliances according to an exemplary embodiment of the present invention may include the surface-treated metal of the present invention.

Another aspect of interior and exterior components for domestic appliances according to the exemplary embodiment of the present invention can include a component body, and an inorganic-organic composite film formed on at least a portion of the surface of the component body. The inorganic-organic composite film may have a siloxane bond as a main bond in a main skeleton, and also has, in bonds of either or both of the main skeleton and a side chain, either or both of an ether bond and an amino bond, as well as at least one organic group selected from the group consisting of an alkyl group having 1 to 12 carbon atoms, an aryl group, a carboxyl group, an amino group, and a hydroxyl group.

Another aspect of exhaust components for two-wheeled vehicle or four-wheeled vehicle according to the exemplary embodiment of the present invention can include a component body, and an inorganic-organic composite film formed on at least a portion of the surface of the component body. The inorganic-organic composite film may have a siloxane bond as a main bond in a main skeleton, and may also have, in bonds of either or both of the main skeleton and a side chain, either or both of an ether bond and an amino bond, as well as at least one organic group selected from the group consisting of an alkyl group having 1 to 12 carbon atoms, an aryl group, a carboxyl group, an amino group, and a hydroxyl group. The inorganic-organic composite film may include at least one or more compounds selected from the group consisting of oxides having one or more elements selected from the group consisting of Cu, Fe, Mn, Cr, and Co as constituent components, carbon black, graphite powder, and carbon black subjected to a graphitization treatment.

DETAILED DESCRIPTION

Details of the exemplary embodiments of the present invention are described below. However, it should be understood that the present invention is not limited to the following respective embodiments and, for example, constituent elements of these exemplary embodiments may be appropriately combined.

A surface-treated metal of one exemplary embodiment of the present invention may include a film formed on a surface of a metal base material, and the film has a structure in which an inorganic skeleton in the form of a three-dimensional network is included as a main skeleton, and the main skeleton has an inorganic siloxane bond represented by $\equiv$Si—O—Si$\equiv$ as a main bond. Examples of the bond other than the siloxane bond include an inorganic bond represented by $\equiv$Si—O—M$\equiv$ or $M_1$-O-$M_2\equiv$ (M, $M_1$, and $M_2$ represent metal elements other than Si, for example, Ti or Zr which may exist in the system, and may not always have a valence of 4, although they have a valence of 4 in the above formula), an ether bond such as —$CH_2$—$CH(CH_2)$—O—$CH_2$—, and an amino bond which serves as a secondary or tertiary amine.

An inorganic network structure and an organic network structure may be linked through a Si—C bond to form a structure in which the inorganic and organic networks interpenetrate. The ether bond or the amino bond, or an alkyl or aryl group having 1 to 12 carbon atoms, a carboxyl group, an amino group, or a hydroxyl group may form a part of the main skeleton, or they may be contained in the bond in the side chain. As used herein, the alkyl or aryl group having 1 to 12 carbon atoms includes, for example, a methyl group, an ethyl group, a propyl group, a butyl group, a hexyl group, a 2-ethylhexyl group, a dodecyl group, a phenyl group, a tolyl group, a xylyl group, and a naphthyl group. In the present invention, two or more organic components can be used simultaneously. Among these, a main organic group, for example, an organic group having the highest content is preferably an alkyl or aryl group having 5 to 12 carbon atoms, more preferably an alkyl or aryl group having 6 to 12 carbon atoms, and most preferably an alkyl or aryl group having 6 to 10 carbon atoms. As used herein, the carboxyl group refers to —COOH, the amino group refers to —NH2, and the hydroxyl group refers to —OH, respectively. The phenyl group is preferably used as the organic group in the present invention, and a film having excellent heat resistance, workability, and adhesion on working can be obtained by using the phenyl group alone or in combination with at least one group selected from among alkyl group such as methyl group, aryl group, carboxyl group, amino group, and hydroxyl group, and also using in combination with the siloxane bond constituting the main skeleton.

A content of the organic component in the film according to the exemplary embodiment of the present invention is a mass percentage of all elements consisting of the group to the overall film, and is preferably 0.5% by mass or more and 50% by mass or less, more preferably 1.0% by mass or more and 50% by mass or less, and most preferably 2.0% by mass or more and 40% by mass or less. When the content of the organic group is smaller than the above range, the resultant film may be inferior in workability and also does not have satisfactory workability which is commonly required in a precoated steel sheet. On the other hand, when the content of the organic group is larger than the above range, the resultant film may be deteriorated by the decomposition of the organic group at high temperature and also has insufficient heat resistance.

A ratio of a number of the ether bond and the amino bond in the bonds in the film to that of the siloxane bond is particularly preferably 0.01 or more and 0.5 or less. When a raw material having an epoxy group is used, the ether bond is formed in the film by virtue of the epoxy group. For example, when an alkoxysilane having an epoxy group is used as the raw material, it becomes possible to cure the film by a heat treatment at low temperatures in a short time, or to cure the film at room temperature. In the film dried or cured with heat-treating, the ether bond imparts flexibility to the film and enables bending and deep drawing. When the raw material having an epoxy group is used, high adhesion with a base material can be attained by forming a film in the state where the epoxy group is previously ring-opened. The reason may be as follows: —OH groups can be formed on the surface of metal serving as the base material by moisture in air, and thus a hydrogen bond may be formed between the —OH group and an —OH group formed as a result of ring-opening of the epoxy group. The amino group is a component which reacts with the epoxy group, and therefore the film may be cured at low temperatures.

Therefore, such exemplary procedure enables the curing of the film at low temperatures in a short time, which is suitable for precoating, by using the alkoxysilane having an amino group as the raw material. This is likely because active hydrogen of the amino group is combined with an oxygen atom of the epoxy group to form —OH groups, thereby causing ring-opening of the epoxy group and forming a bond between the —OH group and the epoxy group through a nitrogen atom. A ratio of a number of the ether bond and the amino bond to that of the siloxane bond is preferably 0.01 or more and 0.45 or less, and more preferably 0.05 or more and 0.4 or less. When the ratio is smaller than the above range, it may become difficult to ensure curability at low temperatures as an important performance for precoated steel sheet, or adhesion with metal as the base material. On the other hand, when the ratio is larger than the above range, the resultant film may not necessarily have satisfactory basic properties of the film, for example, hardness and heat resistance.

The inorganic-organic composite film used in the present invention contains an organic component (for example, an alkyl group having 1 to 12 carbon atoms, an aryl group, a carboxyl group, an amino group and a hydroxyl group) bonded directly to a Si atom. A ratio of a number of the organic component to one Si atom is preferably 0.05 or more and 0.95 or less. When the ratio is less than 0.05, it becomes difficult to exhibit sufficient workability. On the other hand, when the ratio is more than 0.95, it becomes difficult to cause gelation of the film so that the temperature of a heat treatment for curing the film must be set to high temperatures or the heat treatment takes a long time, thus causing problems.

The content of the organic component such as alkyl groups among the above organic components in the film can be determined by mass loss when heated to a high temperature of 1000° C. or higher. The content of the epoxy group can be determined by a titration method. However, the measurement may not carried out easily, for example, it may take a relatively long period of time. As a comparison between an amount of the organic component expected from an amount of raw materials and an amount of the organic component determined by the above-described quantitative exemplary method using various typical samples, there may be substantially no difference between the two amounts in the case of a film formed by heat-treating at a temperature of 500° C. or less. Therefore, it is possible that the content calculated from the amount of raw materials is the same as that of the organic component in the film. On the other hand, when the film is formed at a temperature higher than the above temperature, the content of the organic substance in the film may be different from the value calculated from the amount of raw materials, and thus the content is preferably determined by the above method, if necessary.

An organic three-dimensional network structure in the exemplary embodiment of the present invention can be formed by drying at room temperature or a heat treatment at low temperatures in a short time. As a result of formation of the organic network structure, inorganic constituent elements come closer to each other, and thus it becomes easy to form an inorganic skeleton structure. Therefore, a heat treatment at 400° C. for about 30 minutes is commonly required so as to form an inorganic skeleton composed mainly of a siloxane bond. However, according to the present invention, as described above, the inorganic skeleton can be formed by drying at room temperature or a heat treatment at low temperatures in a short time.

As another exemplary embodiment of the present invention, a surface-treated metal can be provided that includes a black film, which may be applied to exhaust components for motorcycles or four-wheeled vehicles. To accomplish such task, a film containing a black pigment can preferably be used. In particular, preferred black pigments are oxides including one or more elements selected from the group consisting of Cu, Fe, Mn, Cr, and Co as constituent components, carbon black, graphite powder, and carbon black subjected to a graphitization treatment. Among these pigments, an oxide is preferably used in the case in which heat resistance is required, and a complex oxide containing Cu, Mn, and Fe or a complex oxide containing Cu, Cr, and Mn is particularly preferably used. When electrical resistance of the film is lowered for the purpose of spot welding, the ohmic value of the film may be decreased by using a graphite powder or carbon black subjected to a graphitization treatment.

Amount of the pigment can be appropriately selected according to the purposes and applications, but a percentage of the amount of the pigment to the overall film is commonly decided within a range of 1% by mass or more and 50% by mass or less. The percentage of the amount of the pigment to the overall film is preferably 3% by mass or more and 50% by mass or less, and more preferably 5% by mass or more and 50% by mass or less. When the amount of the pigment is smaller than the above range, the resultant film is not sufficiently colored or does not exhibit properties such as conductivity. On the other hand, when the amount of the pigment is larger than the above range, the resultant film does not sufficiently exhibit properties of the resin as the main component because of a high content of the pigment in the film, and thus required properties of the film may not be obtained.

As the pigment, the above compounds may be used alone or two or more kinds thereof can be used in combination. Describing with reference to the above examples, an oxide or a complex oxide pigment may be added for applications requiring heat resistance, while a conductive pigment such as carbon black may be added for applications requiring conductivity. Furthermore, both heat resistance and conductivity can be satisfied by adding the oxide or the complex oxide together with a graphite powder or carbon black subjected to a graphitization treatment. When plural pigments are simultaneously used, it becomes possible to attain the preferred properties by appropriately adjusting the amount.

Furthermore, either or both of nickel particles and nickel oxide particles can be used as the pigment. Even when these particles are used alone as the pigment, the resultant film exhibits a gray or black color. However, when these particles are added together with the above oxide, complex oxide, carbon black, graphite powder, or the like, a black film having remarkably excellent heat resistance can be obtained. The amount of nickel particles and nickel oxide particles used as the pigment is preferably adjusted to be the same amount as that of the black pigment, and a ratio of a total amount of the black pigment such as the oxide or the complex oxide, the nickel particles, and the nickel oxide particles to the overall film is preferably adjusted within a range of 1 to 50% by mass.

According to another exemplary embodiment of the present invention, a surface-treated metal can be provided which includes a film formed on a surface of a metal base material, the film containing 20 to 40% by mass of a phenyl group as the organic group and 10 to 30% by mass of a complex oxide of Cu, Mn, and Fe as the black pigment, is particularly suitable for use in exhaust components for motorcycles and four-wheeled vehicles. With the above composition of the film formed on the surface, it is possible to obtain a film which has high hardness, excellent in bulging and deep drawability, and is also excellent in adhesion on bending.

The film may contain Si as the metal component, and may also contain one or more metal elements selected from among B, Al, Ge, Ti, Y, Zr, Nb, and Ta as the other elements. Among these elements, Al, Ti, Nb, and Ta fulfils a catalytic function for completing curing of the film at low temperatures or curing in a short time when acid is added as a catalyst in the system. When these metal alkoxides are added in the presence of the catalyst such as the acid, a ring-opening rate of epoxy increases, thus it enables curing at low temperatures in a relatively short time preferably used for precoating. Ti is often used and Ti-alkoxides such as Ti-ethoxide and Ti-isopropoxide are used as the raw material.

In the exemplary system containing Zr added therein, alkali resistance of the film is remarkably improved so that the system is preferably used for applications requiring alkali resistance. In the case of adding Zr for this purpose, a ratio of a Zr atom to a Si atom, Zr/Si, is within a range of 1/20 to 2/3, preferably of 1/20 to 3/5, and more preferably of 1/10 to 3/5.

When the content of Zr is smaller than the above range, it may become difficult to exhibit sufficient alkali resistance. On the other hand, when the content of Zr is larger than the above range, properties of the film composed mainly of a siloxane bond of the present invention may be impaired because the properties of the film are replaced by properties originating in a Zr oxide.

When the metal element is added, a bond to be produced may vary depending on the kind of raw materials. When conventional raw materials such as metal alkoxide are used, a portion of a three-dimensional network of siloxane as a main component may be replaced by a bond such as —Ti—O—Ti— or —Ti—O—Si—, or —Zr—O—Zr— or —Zr—O—Si—. In some cases, the bond may exist not in the main skeleton, but in bonds of the side chain. When Zr is added, the above bond may be replaced, thus the alkali resistance of the overall film is improved.

The composite film used in the exemplary embodiment of the present invention can contain an alkyl group having 1 to 12 carbon atoms, a portion of which is a fluoro-substituted alkyl group. In this case, the resultant film is excellent in water repellency, contamination resistance, and fingerprint resistance. The fluoro-substituted alkyl group preferably has 1 to 12 carbon atoms. This is likely because the fluoro-substituted alkyl group preferably has approximately the same property as that of a non-fluoro-substituted alkyl group contained in the film. The fluoro-substituted alkyl group having more than 12 carbon atoms is not preferred because curing of the film is inhibited and the resultant film is soft and does not have practical hardness.

A rate of a total amount of the fluoro-substituted alkyl group and the organic component to the overall film can be appropriately set within a range of 0.5% by mass or more and 50% by mass or less. When the amount is smaller than the above range, the resultant film is insufficient in water repellency and contamination resistance. On the other hand, when the amount is larger than the above range, properties of the film of the present invention obtained by the siloxane bond may be impaired. The rate of the total amount of the fluoro-substituted alkyl group and the organic component to the overall film required to attain the above object is preferably 1.0% by mass or more and 50% by mass or less, and more preferably 2.0% by mass or more and 40% by mass or less.

The metal base material, at least a portion of which is coated with the inorganic-organic composite film, of the present invention may not be influenced by an external environment because the coated portion is protected from corrosive gas, heat, friction, oxygen, water, steam, and various chemicals. The metal base material as used herein for the exemplary embodiments of the present invention is not specifically limited and any metal base material can be used and, for example, metal sheets such as a plated steel sheet, a stainless steel sheet, a titanium sheet, an aluminum sheet, and an aluminum alloy sheet are preferably used.

Examples of the plated steel sheet can include a zinc plated steel sheet, a zinc-iron alloy plated steel sheet, a zinc-nickel alloy plated steel sheet, a zinc-chromium alloy plated steel sheet, a zinc-aluminum alloy plated steel sheet, an aluminum plated steel sheet, a zinc-aluminum-magnesium alloy plated steel sheet, a zinc-aluminum-magnesium-silicon alloy plated steel sheet, an aluminum-silicon alloy plated steel sheet, a galvanized stainless steel sheet, and an aluminum-plated stainless steel sheet.

Examples of the stainless steel sheet can include a ferritic stainless steel sheet, a martensitic stainless steel sheet, and an austenitic stainless steel sheet. The stainless steel sheet has a thickness within a range of about several tens of millimeters to about 10 μm, and a thin stainless steel sheet which is a so-called stainless steel foil produced by rolling is also included as an example of the stainless steel sheet. Surface of the stainless steel sheet and the stainless steel foil may be subjected to a surface treatment such as bright-annealing or buffing.

Examples of the aluminum alloy sheet include those made of JIS1000 series (pure Al), JIS2000 series (Al—Cu alloy), JIS3000 series (Al—Mn alloy), JIS4000 series (Al—Si alloy), JIS5000 series (Al—Mg alloy), JIS6000 series (Al—Mg—Si alloy) and JIS7000 series (Al—Zn alloy).

The surface-treated metal of the present invention may be a surface-treated metal in which the above inorganic-organic composite film is formed directly on at least a portion of the surface of metal as a base material, that is, a surface-treated metal including only the inorganic-organic composite film according to the present invention. Alternatively, the surface-treated metal of the present invention may be a surface-treated metal in which the above inorganic-organic composite film is formed on a metal base material with one or more other films, thereby forming a multi-layered film. For example, an exemplary surface-treated metal can be provided, in which the inorganic-organic composite film used in the exemplary embodiments of the present invention is formed on a surface of a metal which is subjected to a chromate treatment to form a chromated film, or a surface of metal which is subjected to a known surface treatment (for example, phosphating treatment) other than the chromate treatment.

The surface-treated metal of the present invention can be used as a material, and also it can be preferably used in a state of being formed into components. Applications of the components include, but are not limited to, domestic appliances, vehicle components, and building materials. The components are particularly suitable for use in domestic appliances requiring heat resistance because the film formed on the surface is particularly excellent in heat resistance and corrosion resistance. Examples thereof include cooking utensils such as microwave ovens and gas ovens; kitchen utensils such as table ranges, built-in ranges and range hoods; and heating units and air conditioners, such as fan heaters and air conditioner. Also the surface-treated metal is suitable for use in vehicle components, and is particularly suitable for use in exhaust components such as mufflers.

A thickness of the inorganic-organic composite film used in the present invention varies depending on properties or applications, but is preferably 0.1 μm or more and 25 μm or less, more preferably 0.1 μm or more and 20 μm or less, and most preferably 0.2 μm or more and 10 μm or less. When the thickness of the film is thinner than the above range, it is difficult to form a uniform film having predetermined properties. On the other hand, when the thickness of the film is thicker than the above range, the resulting film may be insufficient in formability or adhesion on working.

The method for producing the surface-treated metal according to an exemplary embodiment of the present invention is described as follows. For example, the method for producing the surface-treated metal according to the exemplary embodiment of the present invention may be a method including applying a coating solution (surface treating agent) on a metal base material, followed by curing with heat-treating, and is characterized by the coating solution to be used.

The metal surface treating agent used in the exemplary embodiment of the present invention is a coating solution containing, as main components, one or more compounds selected from the group consisting of alkoxysilanes such as alkoxysilane having an epoxy group, alkoxysilane having an alkyl group having 1 to 12 carbon atoms, alkoxysilane having an aryl group, and tetraalkoxysilane, and hydrolyzates thereof, and it becomes possible to obtain a surface-treated metal wherein an inorganic-organic composite film containing a siloxane bond as a main bond in the main skeleton is formed on at least a portion of the surface of the metal base material by applying the coating solution on the surface of the metal base material, followed by heat-treating at a temperature of 150° C. or higher.

Among these components, the alkoxysilane having the epoxy group is a component which is capable of curing the coating solution at a normal temperature, or curing at low temperatures in a short time. As the alkoxysilane having the epoxy group, for example, there can be preferably used γ-glycidoxypropyltrimethoxysilane, γ-glycidoxypropyltriethoxysilane, γ-glycidoxypropyltripropoxysilane, γ-glycidoxypropyltributoxysilane, 3,4-epoxycyclohexylmethyltrimethoxysilane, 3,4-epoxycyclohexylmethyltriethoxysilane, β-(3,4-epoxycyclohexyl)ethyltrimethoxysilane and β-(3,4-epoxycyclohexyl)ethyltriethoxysilane. In view of ease of handling and reactivity, γ-glycidoxypropyltriethoxysilane is used particularly preferably. All or a portion of alkoxy groups of the alkoxysilane having an epoxy group may be hydrolyzed in the treating solution.

In particular, this function can be enhanced by previously ring-opening the epoxy group of the alkoxysilane. This may be because the addition reaction between the epoxy group and the amino group as the other component can be allowed to proceed at low temperatures in a short time. The ring-opening of the epoxy group can be performed by previously mixing the epoxy group with a metal alkoxide other than the alkoxysilane and an acid catalyst.

Examples of the alkoxysilane having an alkyl group having 1 to 12 carbon atoms include methyltrimethoxysilane, dimethyldimethoxysilane, methyltriethoxysilane, dimethyldiethoxysilane, hexyltrimethoxysilane, hexyltriethoxysilane, decyltrimethoxysilane, and decyltriethoxysilane. Examples of the alkoxysilane having an aryl group include phenyltrimethoxysilane, diphenyldimethoxysilane, phenyltriethoxysilane, and diphenyldiethoxysilane. Among these alkoxysilanes, phenyltrimethoxysilane and phenyltriethoxysilane are used particularly preferably. The use of the alkoxysilane having a phenyl group makes it possible to easily obtain a film which is excellent in heat resistance, workability, and adhesion on working.

The coating solution used in the exemplary embodiment of the present invention can further contain tetraalkoxysilane and a hydrolyzate thereof as the main component. A pencil hardness of the resulting silica-based film can be further enhanced by containing the tetraalkoxysilane in the silica-based coating solution. If necessary, an alkoxide as the metal component other than tetraalkoxysilane can be used as the additive component other than the main component. When at least one or more metal alkoxides selected from Ti, Al, Ta, and Nb is added and acetic acid is used as an acid catalyst, the ring-opening rate of the epoxy group increases and the effect of curing at low temperatures in a short time is enhanced. All or a portion of alkoxy groups in the metal alkoxide other than alkoxysilane may be hydrolyzed.

As described above, the alkoxysilane having an amino group is a component which reacts with the epoxy group, thereby accelerating curing at low temperatures in a short time. This may be because active hydrogen of the amino group is combined with an oxygen atom of the epoxy group to form —OH groups, thereby causing ring-opening of the epoxy group and forming of a bond between the —OH group and the epoxy group through a nitrogen atom. As the alkoxysilane having an amino group, for example, there can be preferably used aminopropyltrimethoxysilane, aminopropyltriethoxysilane, (β-aminoethyl)-β-aminopropyltrimethoxysilane, (β-aminoethyl)-β-aminopropylmethyldimethoxysilane and (β-aminoethyl)-γ-aminopropyltrimethoxysilane. Among these, aminopropyltriethoxysilane is used particularly preferably in view of ease of handling. Similar to the alkoxysilane having an epoxy group, all or a portion of alkoxy groups of the alkoxysilane having an amino group may be hydrolyzed in the treating solution.

A content of the alkoxysilane having an amino group or a hydrolyzate thereof (here, in the case in which both of the alkoxysilane and the hydrolyzate thereof are included, the above content is a total content of the both) is not specifically limited, but is commonly 10 parts by mass or more and 200 parts by mass or less with respect to 100 parts by mass of the alkoxysilane having an epoxy group or a hydrolyzate thereof (here, in the case in which both of the alkoxysilane and the hydrolyzate thereof are included, the above content is a total content of the both). When the content is less than 10 parts by mass, the above amine addition reaction slowly proceeds and curing at low temperatures may be inhibited, thus causing a problem for precoating. On the other hand, when the content is more than 200 parts by mass, a polymerization degree increases excessively, thus the silica-based coating solution is gelled and storage stability is deteriorated.

As described above, the coating solution used in the exemplary embodiment of the present invention may contain a siloxane-based polymer, and the siloxane-based polymer preferably shows distribution of a molecular weight within a range of about 102 to 106 as determined by gel permeation chromatography (GPC) in terms of polystyrene. When the lower limit of the molecular weight distribution is smaller than the above range, it becomes difficult to form a film having a proper thickness and the resultant film may be insufficient in elongation and deformation. On the other hand, when the molecular weight distribution is larger than the above range, gelation may occur because of poor stability of the coating solution used for formation of a film. A rate of a content of molecules having the molecular weight distribution within the above range to the entire solid content in the coating solution is preferably 20% by mass or more, and more preferably 25% by mass or more.

In the system in which both molecules having the molecular weight distribution within the above range and molecules having a molecular weight of $10^7$ or more exist, good appearance, adhesion, and heat resistance may be obtained. In such a case, molecules having both molecular weight distributions are preferably contained. Each content of the respective molecules is appropriately decided according to required properties, however a rate of a total amount of both contents to the overall film is preferably 20% by mass or more, and more preferably 25% by mass or more.

To the coating solution used in the method of the exemplary embodiment of the present invention, if necessary, at least one or more compounds selected from the group consisting of oxides including one or more elements selected from the group consisting of Cu, Fe, Mn, Cr, and Co as constituent components, carbon black, graphite powder, and carbon black subjected to a graphitization treatment can be added as the pigment. According to required properties, the kind and amount of the compound used as the pigment can be decided and two or more kinds of components can be used in combination. Since these pigments are commonly added in the form of powder, the particle size exerts a great influence on properties of the coating solution, that is, properties of the film formed on the surface. In the case of forming a thin film, powders having a fine particle size are preferably used. However, since fine powders are not easily dispersed, it is not preferred to use excessively fine powders or to use particles having an excessively small particle size as compared with the thickness of the film.

If needed, the coating solution used in the exemplary embodiment of the method of the present invention can contain compounds of zirconium, for example, at least one of a zirconium alkoxide, a hydrolyzate thereof, and a zirconium oxide (zirconia) sol. This component improves alkali chemical resistance of the coating solution containing silica as the main component used as the coating solution of the present invention. The mechanism of an improvement in alkali resistance by the addition of this component is not necessarily clarified, but it is believed that Si constituting a siloxane bond is replaced by Zr to form a network composed mainly of silica and zirconium, thereby securing resistance to an alkali.

As the zirconium alkoxide, for example, zirconium methoxide, zirconium ethoxide, zirconium normal propoxide, zirconium isopropoxide and zirconium normal butoxide are preferably used. In the case of these compounds, all or a portion of alkoxy groups may be hydrolyzed in the treating solution. Since the alkoxide of zirconium has high reactivity as compared with the alkoxysilane, there can be used an alkoxide derivative wherein a portion of alkoxy groups are replaced by β-diketone, β-ketoester, alkanolamine, alkylalkanolamine, organic acid, or the like for the purpose of controlling the reaction rate.

A zirconia sol can also be used in place of the zirconium alkoxide. It is believed that when the alkoxide of zirconium is used, as described above, there can be formed a bond in which Si of the siloxane bond is replaced by Zr. In contrast, in the case of using the sol, when the coating solution is solidified, zirconium oxide particles are incorporated into oxide of Si as the main component to form a network. Therefore, the same effect as in the case of using the alkoxide of Zr as the starting material can be obtained. When particles contained in the sol are fine particles having an average particle size of 100 nm or less, particularly remarkable effects are exerted.

The zirconia sol as used herein refers to a stabilized suspension wherein fine particles of zirconium oxide are dispersed in a solvent such as water. Although the solvent used herein is not specifically limited, a substance suitable for mixing must be selected because a stable state must be attained by mixing with the alkoxysilane, and various alcohols and water are preferably used. To encure stability of the sol, acids such as organic acid and inorganic acid, and surfactants may be contained.

Particles contained in the sol are preferably made of stable oxide, metastable oxide, hydrated oxide, or hydroxide. Among these, unstable substances such as hydroxide and metastable oxide are used particularly preferably because they have high reactivity and can easily form a network with silica.

The coating solution as the starting material preferably contains at least one of the zirconium alkoxide, the hydrolyzate thereof, and the zirconia sol in a molar ratio, Zr/Si of 1/20 to 2/3, more preferably of 1/20 to 3/5, and most preferably of 1/10 to 3/5. The reason is as follows. That is, as described above, when the content of the zirconium compound is smaller than the above range, a film having sufficient alkali resistance may not be obtained. On the other hand, when the content is larger than the above range, a film having good appearance and practically high hardness may not be obtained.

When the coating solution used in the exemplary embodiment of the present invention contains an alkoxysilane having a fluoro-substituted alkyl group having 1 to 12 carbon atoms as the component other than the main component, fingerprint resistance, water repellency, and contamination resistance can be imparted to the resultant film. A fluoro-substituted alkyl group having more than 12 carbon atoms is not preferred because curing of the film is inhibited and only a soft film having a pencil hardness of lower than the practical hardness is obtained. As the alkoxysilane having a fluoro-substituted alkyl group having 1 to 12 carbon atoms, for example, there can be preferably used trifluoropropyltrimethoxysilane, 3,3,3-trifluoropropyltriethoxysilane, (tridecafluoro-1,1,2,2-tetrahydrooctyl)triethoxysilane and dimethoxymethyl-3,3,3-trifluoropropylsilane. In the case of these alkoxysilanes, all or a portion of alkoxy groups may be hydrolyzed in the coating solution as the raw material.

A content of the alkoxysilane compound having a fluoro-substituted alkyl group having 1 to 12 carbon atoms in the coating solution is preferably 10 parts by mass or more and 100 parts by mass or less with respect to 100 parts by mass of the alkoxysilane having an epoxy group or a hydrolyzate thereof (here, in the case in which both of the alkoxysilane and the hydrolyzate thereof are included, 100 parts by mass of a total of the both). When the content is less than 10 parts by mass, so-called effect of contamination resistance described above may not be exerted. On the other hand, when the content is more than 100 parts by mass, curing at low temperatures may not occur.

To the coating solution used in the present invention, color pigments, moisture resistant pigments, catalysts, rust preventive pigments, metal powders, and aggregates can be added for the purpose of improving design property, corrosion resistance, wear resistance, and catalytic function of the film. Examples of the pigment include, in addition to the compounds described above, oxides and complex oxides including Ti and Al, and metal powders such as Zn powder and Al powder. As the rust preventive pigment, there can be preferably used non-chromic acid pigments such as calcium molybdate, calcium phosphomolybdate and aluminum phosphomolybdate, which are free of environmental pollutants. For the purpose of improving a catalytic function, a self-cleaning function capable of decomposing pollutants is improved by adding photocatalysts such as titanium oxide. Examples of the aggregate include potassium titanate fibers.

To the coating solution used in the exemplary embodiment of the present invention, if necessary, acid catalysts can be added. Examples of the acid catalyst include organic acids such as formic acid, maleic acid, and benzoic acid, and inorganic acids such as hydrochloric acid and nitric acid, and acetic acid is used particularly preferably. When the acid is used as the catalyst, the alkoxysilane used as the raw material is in a polymerized state suitable for formation of a film. Also when acetic acid is used as the catalyst, ring-opening of the epoxy group is accelerated and the effect of curing at low temperatures in a short time is enhanced. The amount of these catalysts is particularly preferably 0.5 parts by mass or more and 10 parts by mass or less with respect to 100 parts by mass of an alkoxysilane having an epoxy group or a hydrolyzate thereof (here, in the case in which both of the alkoxysilane and the hydrolyzate thereof are included, 100 parts by mass of a total of the both), and thus a maximum effect as the catalyst can be exerted. In the case in which a zirconia sol is used as the zirconium compound and an acid is already contained as a stabilizer, the amount of the acid catalyst is preferably calculated, together with the amount of the acid contained in the zirconia sol.

As the additives, for example, leveling agents, antioxidants, ultraviolet absorbers, stabilizers, plasticizers, waxes, and addition type ultraviolet stabilizers can be used in combination. If necessary, the coating solution may contain coating compositions based on fluororesin, polyester resin, and urethane resin as long as the heat resistance of the film is not adversely affected. These additives may be used alone or in combination. If needed, inorganic or metal particles, except for the zirconia sol, color pigments, and dyes can be added.

The coating solution used in the present invention can be prepared by optionally mixing an alkoxysilane other than an alkoxysilane having an amino group with a metal alkoxide or an acid catalyst in an organic solvent which can uniformly disperse or dissolve a solute, and ring-opening an epoxy group, followed by hydrolyzing and adding an alkoxysilane having an amino group. As the organic solvent, for example, various alcohols such as methanol, ethanol, propanol, and butanol, and aromatic organic solvents such as acetone, benzene, toluene, xylene, and ethylbenzene are preferably used alone or in combination.

The coating solution thus prepared can be used after diluting with an organic solvent or water so as to form a film having a required thickness. The coating solution is diluted so that the film obtained by a single coating process has a thickness within a range of 0.2 to 2 µm. Alternatively, a film having a thickness more than the above range may be formed by plural coating processes. The coating solution may be applied after distilling off an alcohol used as the solvent or produced as a result of hydrolysis under normal or reduced pressure.

The coating solution is applied on a metal as the base material by using a dip coating method, a spray coating method, a bar coating method, a roll coating method, or a spin coating method. The film formed in the present invention is excellent in adhesion even if various base materials are not subjected to a pretreatment; however, these base materials can be optionally subjected to a pretreatment before coating. Typical pretreatment include chemical treatments such as acid pickling, alkali degreasing, and chromate treatment, and grinding, polishing and blasting, and these pretreatments can be used alone or in combination.

Since the film to be formed in the exemplary embodiment of the present invention has both inorganic and organic network structures and the inorganic and organic network structures are combined with each other, the film has properties originating in the inorganic component, for example, heat resistance, corrosion resistance, weatherability, and high hardness, as well as workability originating in the organic component. In addition, the film can be cured at low temperatures in a short time because it enables precoating. In the exemplary embodiment of the present invention, a metal base material can preferably be subjected to a heat treatment at a temperature of about 150° C. or higher and 400° C. or lower for about one hour to a few seconds after applying a coating solution.

In general, a film can be cured within a short heat treatment time in the case of a high heat treatment temperature, while the heat treatment requires a longer time in the case of a low heat treatment temperature. In the case in which the drying process or the heat treatment cannot be performed at a sufficiently high temperature for sufficiently long, the film is optionally aged at room temperature for 1 to 5 days after drying, solidification, or curing with heat-treating. This operation can increase hardness of the film immediately after formation of the film.

The surface-treated metal of the present invention is particularly suitable for use in exhaust components for vehicles and motorcycles, although applications are not specifically limited. Typical examples of exhaust components include tail pipe, muffler shell, and end plate. These components can be produced by first producing the surface-treated metals in the form of precoated metal sheets and forming them into predetermined shape, or by forming the metal base materials into predetermined shapes, followed by subjecting a surface treatment to form the film. Recently, black-colored surface-treated metal sheets have often been used as exhaust components. In such a case, surface-treated metals including a film containing a black pigment of the exemplary embodiment of the present invention can preferably be used.

The surface-treated metal of the exemplary embodiment of the present invention are suitable for use in interior and exterior components for domestic appliances, for example, cooking utensils, air conditioners and heating units. For example, applications may include inner compartments and cases for microwave ovens, exterior components for rice cookers, and louvers for air conditioners and heating units. In these applications where a conventional resin film has poor heat resistance, the surface-treated metal including a film of the exemplary embodiment of the present invention can preferably be used.

As described above, since the film formed on the surface of metal of the exemplary embodiment of the present invention is excellent in workability, components can be worked, if necessary, after formation of a film. However, it is more preferred to form a film after working in view of merit during the process such as cost, depending on applications. In such a case, the film can be formed after working of a steel sheet, and it can be used as components including a film formed thereon.

Typical aspects are interior and exterior components for domestic appliances, including a film formed on the surface used in the present invention, and exhaust components for two-wheeled vehicles or four-wheeled vehicles. In particular, they may include interior and exterior components for domestic appliances, including a component body, and an inorganic-organic composite film formed on a surface of the component body, in which the inorganic-organic composite film contains a siloxane bond as a main bond in a main skeleton, and also contains, in bonds of either or both of the main skeleton and the side chain, either or both of an ether bond and an amino bond, as well as at least one organic group selected from the group consisting of an alkyl group having 1 to 12 carbon atoms, an aryl group, a carboxyl group, an amino group, and a hydroxyl group. In addition, they may include exhaust components for two-wheeled vehicles or four-wheeled vehicles, including a component body, and an inorganic-organic composite film formed on a surface of the component body, wherein the inorganic-organic composite film contains a siloxane bond as a main bond in a main skeleton, and also contains, in bonds of either or both of the main skeleton and the side chain, either or both of an ether bond and an amino bond, as well as at least one organic group selected from the group consisting of alkyl group having 1 to 12 carbon atoms, aryl group, carboxyl group, amino group, and hydroxyl group, the inorganic-organic composite film further containing at least one compound selected from the group consisting of oxides including one or more elements selected from the group consisting of Cu, Fe, Mn, Cr, and Co as constituent components, carbon black, graphite powder, and carbon black subjected to a graphitization treatment.

EXAMPLES

The exemplary embodiment of the present invention is described in further detail by way of examples.

Example 1

According to the formulation shown in Table 1, γ-glycidoxypropyltriethoxysilane (GPTE), acetic acid, titanium tetraethoxide (TE), phenyltriethoxysilane (PhES), and tetraethoxysilane (TEOS) were sufficiently mixed with stirring, and then the mixture was hydrolyzed using distilled water mixed with ethanol. To this was added aminopropyltriethoxysilane (APTES), and the solution was hydrolyzed using a mixed solution of distilled water and ethanol to obtain a coating solution for surface treatment. Hydrolysis was performed by several portions. The amount of distilled water shown in Table 1 is the total amount of distilled water used for hydrolysis.

The resultant coating solution was applied on a 0.8 mm thick galvanized steel sheet (coating weight: 90 g/m2 per one surface) which was subjected to a chromate treatment using a bar coater, and then the wet-coated galvanized steel sheet was subjected to a heat treatment at a maximum temperature of 250° C. under such heating conditions that the temperature of the sheet reached 250° C. after 50 seconds to obtain a surface-treated steel sheet including a film formed thereon. The film formed on the surface had a thickness of about 3 μm. Pencil hardness was measured about one day after formation of the film by using a hand scratching method defined in JIS K5400. Heat resistance was evaluated by the following procedure. That is, each test material was allowed to stand continuously in an oven maintained at 300° C. for 120 hours and, after cooling to room temperature, it was observed whether or not film peeling occurs. Also a change in color and gloss before and after the test was measured. Furthermore, workability and adhesion were evaluated by the following T-bending test (2T to 8T). That is, two to eight steel sheets having the same thickness as that of the test material were wound around the test material, and then it was observed whether or not peeling occurred.

The results of FT-IR analysis revealed that the film formed on the surface of the surface-treated steel sheet has a structure such that it contains a siloxane bond as a main bond, and also contains a phenyl group as well as an epoxy bond and an amino bond. The content of the organic component contained in the film after removal of the solvent, and a ratio of the content of the ether bond and the amino bond to that of the siloxane bond are also shown.

TABLE 1

| No. | GPTE (Parts by mass) | Acetic acid (Parts by mass) | TE (Parts by mass) | PhES (Parts by mass) | TEOS (Parts by mass) | APTES (Parts by mass) | Distilled water used for hydrolysis (Parts by mass) |
|---|---|---|---|---|---|---|---|
| 1 | 100 | 15.1 | 0 | 28.8 | 87.0 | 39.7 | 452.6 |
| 2 | 100 | 15.1 | 0 | 57.6 | 87.0 | 39.7 | 452.6 |
| 3 | 100 | 15.1 | 8.2 | 5.8 | 87.0 | 39.7 | 452.6 |
| 4 | 100 | 15.1 | 8.2 | 28.8 | 87.0 | 39.7 | 452.6 |
| 5 | 100 | 15.1 | 8.2 | 57.6 | 87.0 | 39.7 | 452.6 |
| 6 | 100 | 15.1 | 8.2 | 144.0 | 87.0 | 39.7 | 452.6 |
| 7 | 100 | 15.1 | 8.2 | 288.0 | 87.0 | 39.7 | 452.6 |
| 8 | 100 | 9.1 | 8.2 | 172.7 | 74.8 | 39.7 | 452.6 |

TABLE 1-continued

| 9  | 100 | 4.5 | 8.2 | 86.4 | 37.4 | 39.7 | 452.6 |
| 10 | 100 | 3.0 | 8.2 | 57.6 | 24.9 | 39.7 | 452.6 |
| 11 | 100 | 1.5 | 8.2 | 28.8 | 12.5 | 39.7 | 452.6 |

| No. | Content of organic component (% by mass) | Content of ether and amino bonds | Pencil hardness | Resistance to temperature at 300° C. | Critical T-bending art which peeling does not occur | General evaluation |
| --- | --- | --- | --- | --- | --- | --- |
| 1  | 6.5  | 0.12 | 2H | neither film peeling nor discoloration occurred | 2T | A |
| 2  | 11.2 | 0.12 | 2H | neither film peeling nor discoloration occurred | 2T | A |
| 3  | 1.5  | 0.13 | H  | neither film peeling nor discoloration occurred | 3T | B |
| 4  | 6.4  | 0.12 | 2H | neither film peeling nor discoloration occurred | 2T | A |
| 5  | 11.0 | 0.11 | 2H | neither film peeling nor discoloration occurred | 2T | A |
| 6  | 19.1 | 0.09 | 2H | neither film peeling nor discoloration occurred | 2T | A |
| 7  | 25.2 | 0.07 | 2H | neither film peeling nor discoloration occurred | 2T | A |
| 8  | 21.9 | 0.15 | 2H | neither film peeling nor discoloration occurred | 2T | A |
| 9  | 16.5 | 0.21 | H  | neither film peeling nor discoloration occurred | 2T | A |
| 10 | 15.2 | 0.24 | H  | neither film peeling nor discoloration occurred | 2T | A |
| 11 | 8.3  | 0.28 | H  | neither film peeling nor discoloration occurred | 2T | A |

The results of the measurement of the pencil hardness are also shown in Table 1. In all test materials, sufficient film hardness was attained. Also, these test materials showed excellent heat resistance to temperature at 300° C., and discoloration, cracking, and peeling were not observed in the film before and after the test. In the T-bending test, test materials showed excellent adhesion, except for the No. 3 test material. It is believed that the No. 3 test material is slightly inferior in adhesion on bending because of the low content of the organic component. In the general evaluation in the table, the symbol "A" means "Excellent", and the symbol "B" means "Good" (also the same in Table 2 below).

Example 2

100 Parts by mass of γ-glycidoxypropyltriethoxysilane (GPTE), 15.1 parts by mass of acetic acid, 8.2 parts by mass of titanium tetraethoxide (TE), and 201.5 parts by mass of phenyltriethoxysilane (PhES) were sufficiently mixed with stirring, and then the mixture was hydrolyzed using a distilled water mixed with ethanol. To this was added 39.7 parts by mass of aminopropyltriethoxysilane (APTES), and the solution was hydrolyzed using a mixed solution of distilled water and ethanol to obtain a coating solution as a base. The total amount of distilled water required for hydrolysis is 220 parts by mass. The resultant coating solution was mixed with several kinds of black pigments in each amount shown in Table 2 to obtain a black coating solution.

The resultant coating solution was applied on a 0.6 mm thick stainless steel sheet (YUS432) which was treated with an organic $SiO_2$ using a bar coater, and then the wet-coated stainless steel sheet was subjected to a heat treatment at a maximum temperature of 250° C. under heating conditions such that the temperature of the sheet reached 250° C. after 50 seconds to obtain a surface-treated steel sheet including a black film formed thereon. The film formed on the surface had a thickness of about 2 μm. This method is particularly suitable for use as a method for producing a surface-treated metallic material which is used as exhaust components for motorcycles and four-wheeled vehicles.

Pencil hardness, workability, and adhesion (T-bending test) were evaluated by the same procedure as in Example 1. Heat resistance was evaluated by the following procedure. That is, each test material was allowed to stand continuously in an oven maintained at 500° C. for 120 hours and, after cooling to room temperature, it was observed whether or not film peeling occurred. Also, a change in color and gloss before and after the test was measured.

The results of FT-IR analysis revealed that the film formed on the surface of the surface-treated steel sheet has a structure such that it contains a siloxane bond as a main bond, and also contains a phenyl group as well as an epoxy bond and an amino bond. The content of the organic component contained in the film, and a ratio of the content of the ether bond and the amino bond to that of the siloxane bond were 25.3% by mass and 0.13, respectively.

The results of the measurement of the pencil hardness are also shown in Table 2. In all test materials, sufficient film hardness was attained. Also, these test materials showed excellent heat resistance to temperature at 500° C., and discoloration, cracking and peeling were not observed in the film before and after the test. In the T-bending test, all test materials showed excellent results.

Example 3

According to the formulation No. 3 shown in Table 1, components were mixed and also mixed with 57.5 parts by mass (Zr/Si=0.13) of (1) tetrabutoxyzirconium (TBZr), 115 parts by mass (Zr/Si=0.26) of (2) TBZr, and 50 parts by mass (10% by mass in terms of a fluoro-substituted alkyl group) of (3) trifluoropropyltrimethoxysilane to obtain a coating solution, and then a surface-treated steel sheet including a film formed on the surface was produced by the same procedure as in Example 1. Regarding properties of the steel sheet, alkali resistance was evaluated in the case of a film containing zirconium, in addition to pencil hardness, heat resistance, and T-bending test in Example 1. In the case of a film containing a fluoro-substituted alkyl group, contamination resistance was evaluated. The alkali resistance was evaluated by the following procedure. That is, test pieces measuring 5 cm×5 cm were cut out and each test piece was allowed to stand in an aqueous 5% NaOH solution for 24 hours, and then changes in appearance before and after the test as well as mass loss were examined. The contamination resistance was evaluated by the following procedure. That is, ease of wiping off a permanent marker at room temperature was examined. Also a steel sheet contaminated with egg was allowed to stand at 100° C. for one hour and ease of wiping off egg was examined, and then the test results were compared with those in Example 1.

Regarding pencil hardness, heat resistance and T-bending test, the same results as in Example 1 were obtained regardless of the presence or absence and the amount of additives. In the case of a film containing zirconium, a change in appearance before and after the NaOH dipping test was not substantially observed and the resultant film has good alkali resistance. In the case of a film containing a fluoro-substituted alkyl group, similar to the other test materials, the film was excellent in ease of wiping off a permanent marker. In the test using egg, the deposit could be easily removed as compared with the other test materials in Example 1. As is apparent from these results, a film having excellent alkali resistance, including heat resistance, can be formed in the case of the addition of zirconium, while a film having excellent contamination resistance can be formed in the case of the addition of a fluoro-substituted alkyl group.

Example 4

The No. 4 test piece in Example 1 was formed into a shape which is almost the same as that of an inner compartment of a microwave oven.

Also the No. 3 test piece in Example 2 was formed into muffler shells, end plates, and tail pipes for four-wheeled vehicles. During working, neither peeling nor damage to the film, except at the weld zone, was observed. To simulate practical operating conditions, the resultant components were subjected to a thermal cycling test (24 cycles), each cycle including heating at 300° C. for one hour and air-cooling in an air for one hour. In the case of both the No. 4 test piece in Example 1 and the No. 3 test piece in Example 2, no change in appearance of the film was not observed and also peeling was observed before and after the thermal cycling test.

As is apparent from the above results, the surface-treated steel sheet of the present invention is most suitable for use in inner compartments of microwave ovens or muffler materials for vehicles.

TABLE 2

| No. | Base coating solution (Parts by mass) | Black pigment | Amount (Parts by mass) | Pencil hardness | Resistance to temperature at 500° C. | Critical T-bending at which peeling does not occur | General evaluation |
|---|---|---|---|---|---|---|---|
| 1 | 95 | Cu—Mn—Fe oxide | 5.0 | 2H | neither film peeling nor discoloration occurred | 2T | A |
| 2 | 90 | Cu—Mn—Fe oxide | 10 | 2H | neither film peeling nor discoloration occurred | 2T | A |
| 3 | 80 | Cu—Mn—Fe oxide | 20 | 2H | neither film peeling nor discoloration occurred | 2T | A |
| 4 | 60 | Cu—Mn—Fe oxide | 40 | 2H | neither film peeling nor discoloration occurred | 2T | A |
| 5 | 100 | Graphitized carbon black | 25 | 2H | neither film peeling nor discoloration occurred | 2T | A |
| 6 | 100 | Graphite powder | 15 | 2H | neither film peeling nor discoloration occurred | 2T | A |
| 7 | 100 | Graphite powder | 30 | H | neither film peeling nor discoloration occurred | 2T | A |
| 8 | 100 | Cu—Mn—Fe oxide NiO powder | 10 10 | 2H | neither film peeling nor discoloration occurred | 2T | A |

According to the exemplary embodiments of the present invention, surface-treated metals such as precoated steel sheet can be obtained, which have satisfactory heat resistance, workability, and adhesion on working at a high level. Even in the case of exhaust components for vehicles and motorcycles, which are required to be black color, there can be obtained surface-treated metals which satisfy the above properties. Furthermore, according to the exemplary embodiment of the present invention, these surface-treated metals can be suitably produced without requiring large-scale modification of facilities.

While the invention has been described in connecting with preferred embodiments, it will be understood by those of ordinary skill in the art that other variations and modifications of the preferred embodiments described above may be made without departing from the scope of the invention. Other embodiments will be apparent to those of ordinary skill in the art from a consideration of the specification or practice of the invention disclosed herein. It is intended that the specification and the described examples are considered as exemplary only, with the true scope and spirit of the invention indicated by the following claims. Additionally, all references and publication cited herein are hereby incorporated by reference as though set forth fully herein.

What is claimed is:

1. A surface-treated metal, comprising:
  a metal base material treated with an organic $SiO_2$; and
  an inorganic-organic composite film provided on at least a portion of a surface of the metal base material treated with the organic $SiO_2$, wherein the inorganic-organic composite film comprises:
    a siloxane bond as a main bond in a main skeleton,
    at least one of an ether bond or an amino bond in bonds of at least one of the main skeleton or a side chain,
    at least one organic group which includes at least one of an alkyl group having approximately 1 to 12 carbon atoms, an aryl group, a carboxyl group, an amino group, or a hydroxyl group, at least one phenyl group, and
at least one or more of oxides having at least one or more of Cu, Fe, Mn, Cr or Co as constituent components, carbon black, graphite powder, or carbon black subjected to a graphitization treatment,
wherein a percentage of an organic component in the inorganic-organic composite film to an overall composition of the inorganic-organic composite film is at least 0.5% by mass and at most 50% by mass, and
wherein a ratio of a content of the ether bond and the amino bond in the bonds in the inorganic-organic composite film to a content of the siloxane bond is 0.01 or more and 0.5 or less.

2. The surface-treated metal according to claim 1, wherein the inorganic-organic composite film further comprises at least one of nickel particles or nickel oxide particles.

3. The surface-treated metal according to claim 1, wherein the inorganic-organic composite film has zirconium in a molar ratio of zirconium to silicon Zr/Si of 1/20 to 2/3.

4. The surface-treated metal according to claim 1, wherein the inorganic-organic composite film has the alkyl group having 1 to 12 carbon atoms as the organic group, and a portion of the alkyl group is a fluoro-substituted alkyl group.

5. The surface-treated metal according to claim 1, wherein the metal base material is one of a plated steel sheet, a stainless steel sheet, a titanium sheet, an aluminum sheet, or an aluminum alloy sheet.

6. An exhaust component for a two-wheeled vehicle or a four-wheeled vehicle, comprising the surface-treated metal according to any one of claims 1 and 2-5.

7. An interior and exterior component for a domestic appliance, comprising:
a surface-treated metal comprising a metal base material treated with an organic $SiO_2$ and an inorganic-organic composite film provided on at least a portion of a surface of the metal base material treated with the organic $SiO_2$, wherein the inorganic-organic composite film comprises:
a siloxane bond as a main bond in a main skeleton,
at least one of an ether bond or an amino bond in bonds of at least one of the main skeleton or a side chain,
at least one organic group which includes at least one of an alkyl group having approximately 1 to 12 carbon atoms, an aryl group, a carboxyl group, an amino group, or a hydroxyl group,
at least one phenyl group, and
at least one or more of oxides having at least one or more of Cu, Fe, Mn, Cr or Co as constituent components, carbon black, graphite powder, or carbon black subjected to a graphitization treatment,
wherein a percentage of an organic component in the inorganic-organic composite film to an overall composition of the inorganic-organic composite film is at least 0.5% by mass and at most 50% by mass, and
wherein a ratio of a content of the ether bond and the amino bond in the bonds in the inorganic-organic composite film to a content of the siloxane bond is 0.01 or more and 0.5 or less.

8. An interior and exterior component for a domestic appliance, comprising:
a component body treated with an organic $SiO_2$; and
an inorganic-organic composite film provided on at least a portion of the surface of the component body treated with the organic $SiO_2$, wherein the inorganic-organic composite film comprises:
a siloxane bond as a main bond in a main skeleton,
at least one of an ether bond or an amino bond in bonds of at least one of the main skeleton or a side chain,
at least one organic group of an alkyl group having 1 to 12 carbon atoms, an aryl group, a carboxyl group, an amino group, or a hydroxyl group,
at least one phenyl group, and
at least one or more of oxides having at least one or more of Cu, Fe, Mn, Cr or Co as constituent components, carbon black, graphite powder, or carbon black subjected to a graphitization treatment,
wherein a percentage of an organic component in the inorganic-organic composite film to an overall composition of the inorganic-organic composite film is at least 0.5% by mass and at most 50% by mass, and
wherein a ratio of a content of the ether bond and the amino bond in the bonds in the inorganic-organic composite film to a content of the siloxane bond is 0.01 or more and 0.5 or less.

9. An exhaust component for a two-wheeled vehicle or a four-wheeled vehicle, comprising:
a component body treated with an organic $SiO_2$;
an inorganic-organic composite film formed on at least a portion of the surface of the component body treated with the organic $SiO_2$, wherein the inorganic-organic composite film comprises:
a siloxane bond as a main bond in a main skeleton,
at least one of an ether bond or an amino bond in bonds of at least one of the main skeleton or a side chain,
at least one organic group of an alkyl group having 1 to 12 carbon atoms, an aryl group, a carboxyl group, an amino group, or a hydroxyl group,
at least one phenyl group, and
at least one or more of oxides having at least one or more of Cu, Fe, Mn, Cr or Co as constituent components, carbon black, graphite powder, or carbon black subjected to a graphitization treatment,
wherein a percentage of an organic component in the inorganic-organic composite film to an overall composition of the inorganic-organic composite film is at least 0.5% by mass and at most 50% by mass, and
wherein a ratio of a content of the ether bond and the amino bond in the bonds in the inorganic-organic composite film to a content of the siloxane bond is 0.01 or more and 0.5 or less.

* * * * *